United States Patent [19]
Hennessey

[11] 3,831,139
[45] Aug. 20, 1974

[54] SHIPS'S ANCHOR DRAG INDICATOR

[76] Inventor: Thomas S. Hennessey, 971 Cold Springs, Santa Barbara, Calif. 93108

[22] Filed: Jan. 26, 1973

[21] Appl. No.: 327,155

[52] U.S. Cl.......... 340/29, 114/206 R, 200/61.45 R
[51] Int. Cl............................................. B63b 21/24
[58] Field of Search....... 340/27 AT, 29; 200/61.45, 200/61.47, 61.52, 230, 61.45 R; 116/113; 114/206 R; 73/515 R, 516 R

[56] References Cited
UNITED STATES PATENTS

| 608,104 | 7/1898 | Buckley | 340/29 |
|---|---|---|---|
| 2,124,497 | 7/1938 | Slauson | 340/29 |
| 2,507,986 | 5/1950 | Liss | 340/29 |
| 3,482,066 | 12/1969 | Zuehlke | 200/61.45 R |
| 3,564,496 | 2/1971 | Brooks et al. | 200/61.45 R |
| 3,579,182 | 5/1971 | Schneider | 340/29 |
| 3,683,136 | 8/1972 | Van Den Bosch | 200/61.47 |
| 3,743,802 | 7/1973 | Avenick | 200/61.47 |

Primary Examiner—Kathleen H. Claffy
Assistant Examiner—Randall P. Myers

[57] ABSTRACT

A motion responsive device for use on boat anchors and other movable structures including an outer shell containing a liquid, a float in the shell having a spherical chamber therein containing a pool of mercury or other conductive liquid, a weight for maintaining the shell normally in a given position, an electrical contact ring about the inside of the spherical float or inner shell and a ground contact to the pool of mercury whereby a circuit is completed upon movement of the assembly sufficient to cause the float to rock and permit the pool of mercury to make electrical contact with the contact ring.

6 Claims, 5 Drawing Figures

PATENTED AUG 20 1974 3,831,139

SHIP'S ANCHOR DRAG INDICATOR

PRIOR ART

In the prior art there is a Marine Anchor Alarm, U.S. Pat. No. 3,428,942 and an Acceleration Responsive Switch Including A Buoyant Sensor, U.S. Pat. No. 3,482,066.

My invention is capable of use in any situation where movement of a structure can be sensed and signaled. One example is in a boat anchor where it is highly desirable to be notified if the anchor drags.

It is a general object of the invention to provide a device motion responsive including an outer shell adapted to be mounted upon a boat anchor or other structure, the outer shell having a chamber with a liquid therein; a float or spherical inner shell in the chamber of the outer shell and partially submerged therein, the inner float having a pool of mercury or other conductive liquid therein and contact means, preferably in the form of a ring in the inner shell or float, the pool of mercury and the contact ring being parts of a circuit which is closed upon tilting or agitation of the inner shell to provide a circuit for a signal located on the boat.

The above and other objects will more fully appear from the following description in connection with the accompanying drawing.

Figure 1:
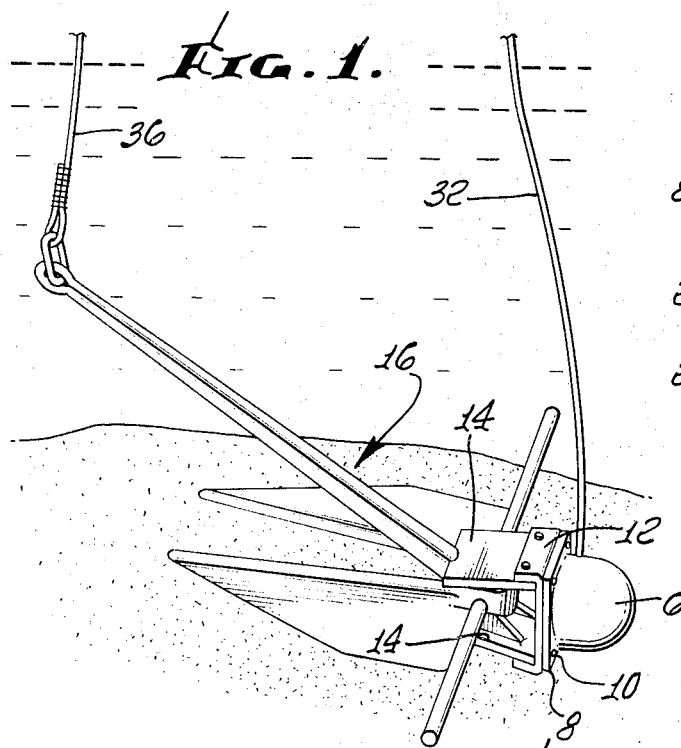
FIG. 1 is a perspective view of a boat anchor with an embodiment of the invention secured thereto.

In the drawing there is shown a housing or shell 6 preferably having a flat side 8 by means of which it can be secured by suitable fasteners 10 to a bracket 12, the bracket being secured to spaced plates 14 on an anchor 16. The outer shell 6 defines a spherical chamber 18 nearly filled with a liquid 20 which may be water or other suitable substances.

Figure 2:
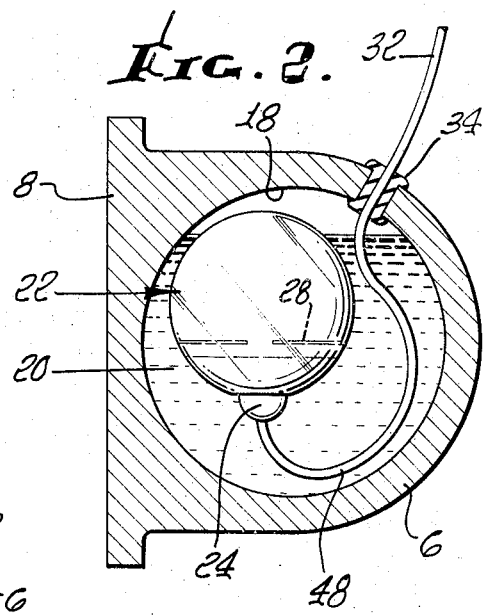
FIG. 2 is an enlarged vertical section view through the motion responsive device.
Figure 5:
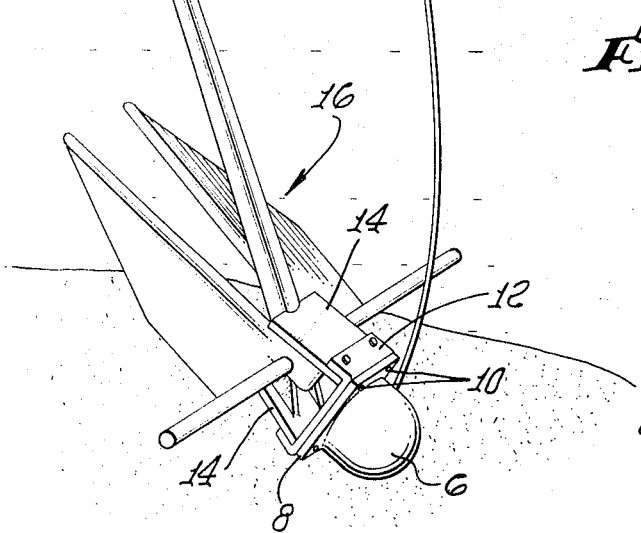
FIG. 5 is a vertical sectional view through the inner float or shell and showing the elements of the circuitry.
Figure 5:
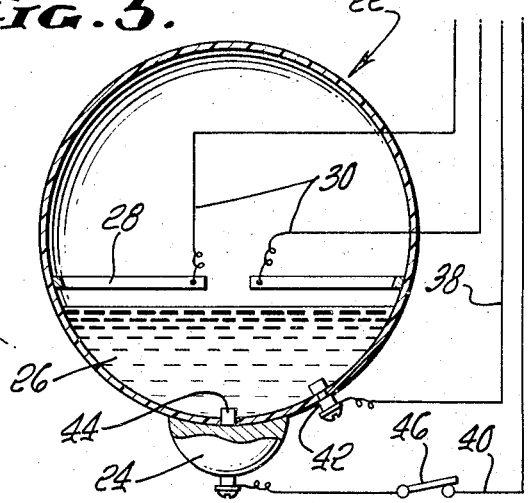

Within the chamber 18 and nearly submerged in the liquid 20 is a spherical float 22 made of a suitable plastic or other dielectric material. The float 22 has a weight 24 secured thereto, the weight normally maintaining the float in the position of FIGS. 2 and 5. Within the float 22 is a pool of conductive liquid 26, preferably mercury. The top level of the pool, as viewed in FIG. 5, is in the lower hemisphere of the float and a short distance thereabove is an electrical contact ring 28. The contact ring is split as shown in FIG. 5 and its ends have wires 30 connected thereto, said wires being in series in a circuit having a suitable source of energy. The wires 30 are housed in a water-proof covering 32 which leads through a grommet 34 in the wall of the outer shell 6 and extends up to the boat or ship to which the anchor 16 is connected by an anchor line 36.

Also located in the conductor sheath 32 are wires 38 and 40. Wire 38 runs to a conductor 42 which extends through the wall of the float 22 and lies in the pool of mercury 26. Wire 40 extends through the weight 24 and has a contact pole 44 at the bottom of the pool of mercury, said wire leading to a ground connection on the vessel.

Figure 3:
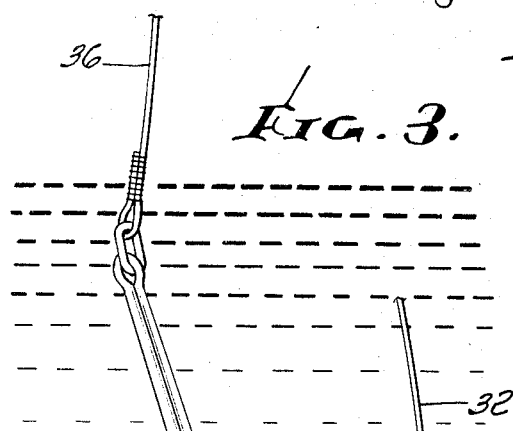
FIG. 3 is a perspective view of the boat anchor and the motion responsive device showing the anchor in a tilted position as distinguished from its position in FIG. 1.
Figure 4:
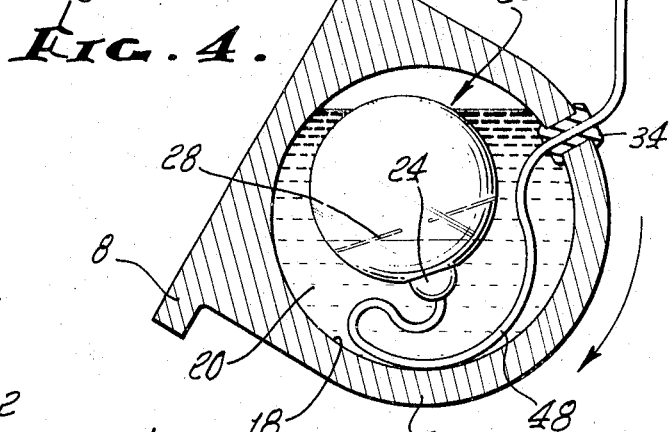
FIG. 4 is an enlarged vertical sectional view through the motion responsive device showing it tilted in a manner similar to that in FIG. 3.

FIG. 1 illustrates the anchor 16 in a position at rest on the bottom of a body of water. FIG. 3 illustrates the anchor in a tilted position as it might assume if the anchor is dragging. In the rest position of FIG. 1, the motion responsive device would generally be in a position of the device illustrated in FIG. 2 but in the drag position of the anchor, the motion responsive device might assume a tilted position as indicated in FIG. 4. This will bring the mercury pool 26 into electrical contact with the contact ring 28 in the float 22 and actuate a suitable alarm at a remote point, such as on board a vessel.

The float 22 being spherical, and the contact ring 28 being located closely above the pool of mercury 26, any shifting movement will displace the mercury pool from its condition of rest so that it will move in any direction, and even with a slight tilting of the float, said pool will contact the conductor ring 28.

If desired, a suitable switch 46 can be placed in one of the lines to deactivate the circuit when desired.

It should be noted that the several wires in the sheath 32 lie in a slack curve 48 in the outer shell 6 in order that the float 22 will be suspended freely in the body of water 20, thereby permitting the float 22 to react to motion with considerable sensitivity.

It should of course be understood that various changes can be made in the form, details, arrangement and proportions of the various parts without departing from the spirit of the invention.

I claim:

1. A motion responsive device for a movable body, a shell mounted on said movable body and comprising a sealed outer chamber with a non-conductive liquid therein, a float partially submerged in said liquid, said float having a spherical chamber therein, a pool of electrically conductive liquid in the spherical chamber, a contact ring about the interior of said spherical chamber above the level of said liquid pool, first electrical conductor means connected to said contact ring, and second conductor means in contact with said pool of electrical conductive liquid wherein said first and second conductor means pass through the non-conductive liquid and the outer chamber.

2. The structure in claim 1, and said pool, when at rest, having a level in the lower hemisphere of said spherical chamber.

3. The structure in claim 1, and said pool, when at rest, having a level in the lower hemisphere of the spherical chamber, and said contact ring also being located in the lower hemisphere of said spherical chamber.

4. The structure in claim 1, and said float being balanced in the liquid in said outer chamber and normally maintaining said contact ring in a horizontal position.

5. The structure in claim 1, and the conductor means connected to said contact ring having a slack portion in the outer chamber to permit the float to move freely.

6. The structure in claim 1, and said float having a generally spherical exterior.

* * * * *